(12) United States Patent
Gruteser et al.

(10) Patent No.: US 11,995,986 B2
(45) Date of Patent: *May 28, 2024

(54) VEHICULAR INFORMATION SYSTEMS AND METHODS

(71) Applicant: Rutgers, The State University of New Jersey, New Brunswick, NJ (US)

(72) Inventors: Marco Gruteser, Princeton, NJ (US); Suhas Mathur, Piscataway, NJ (US)

(73) Assignee: Rutgers, The State University of New Jersey, New Brunswick, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,076

(22) Filed: Jan. 19, 2023

(65) Prior Publication Data

US 2023/0154329 A1  May 18, 2023

Related U.S. Application Data

(63) Continuation of application No. 16/809,969, filed on Mar. 5, 2020, now Pat. No. 11,663,916, which is a continuation of application No. 16/030,149, filed on Jul. 9, 2018, now Pat. No. 10,657,815, which is a continuation of application No. 15/424,442, filed on Feb. 3, 2017, now Pat. No. 10,043,389, which is a continuation of application No. 14/841,085, filed on Aug. 31, 2015, now Pat. No. 9,564,052, which is a continuation of application No. 13/942,274, filed as
(Continued)

(51) Int. Cl.
*G08G 1/14* (2006.01)
*B60Q 9/00* (2006.01)
*G06V 20/58* (2022.01)
*G08G 1/01* (2006.01)

(52) U.S. Cl.
CPC ............. *G08G 1/141* (2013.01); *B60Q 9/004* (2013.01); *G06V 20/586* (2022.01); *G08G 1/01* (2013.01); *G08G 1/0112* (2013.01); *G08G 1/0129* (2013.01); *G08G 1/0141* (2013.01); *G08G 1/14* (2013.01); *G08G 1/143* (2013.01); *G08G 1/147* (2013.01)

(58) Field of Classification Search
CPC ........ G08G 1/141; G08G 1/01; G08G 1/0112; G08G 1/0129; G08G 1/0141; G08G 1/14; G08G 1/143; G08G 1/147; B60Q 9/004; G06V 20/586
See application file for complete search history.

(56) References Cited

U.S. PATENT DOCUMENTS 6,285,297 B1  9/2001 Ball
6,340,935 B1  1/2002 Hall
(Continued)

*Primary Examiner* — Daryl C Pope
(74) *Attorney, Agent, or Firm* — Brooks Kushman P.C.

(57) ABSTRACT

Disclosed is a method and system that receives sensor information from each of a plurality of sensors. Each sensor in the plurality is associated with a vehicle. The sensor information includes location coordinates of each vehicle in the plurality. The sensor information associated with each vehicle in the plurality then is translated to parking statistics information. In one embodiment, the translation is based on an aggregate of sensor information corresponding to the plurality of vehicles. The system then communicates parking statistics information to the vehicle.

29 Claims, 14 Drawing Sheets

Related U.S. Application Data application No. PCT/US2010/034729 on May 13, 2010, now Pat. No. 9,123,245.

(60) Provisional application No. 61/177,710, filed on May 13, 2009.

(56) References Cited

U.S. PATENT DOCUMENTS

| | | |
|---|---|---|
| 6,426,708 B1 | 7/2002 | Trajkovic et al. |
| 6,750,786 B1 | 6/2004 | Racunas, Jr. |
| 7,492,283 B1 | 2/2009 | Racunas, Jr. |
| 8,422,737 B2 | 4/2013 | Scherl et al. |
| 8,542,128 B2 | 9/2013 | Kawabata et al. |
| 9,123,245 B2 | 9/2015 | Gruteser et al. |
| 9,564,052 B2 | 2/2017 | Gruteser et al. |
| 10,043,389 B2 | 8/2018 | Gruteser et al. |
| 10,657,815 B2 * | 5/2020 | Gruteser ............... G08G 1/0129 |
| 2003/0160717 A1 * | 8/2003 | Mattes .................... G01S 13/87 |
| | | 342/72 |
| 2003/0162536 A1 | 8/2003 | Panico |
| 2006/0267799 A1 | 11/2006 | Mendelson |
| 2008/0316056 A1 | 12/2008 | Ghatak |
| 2009/0243888 A1 | 10/2009 | Kawabata et al. |
| 2009/0312912 A1 * | 12/2009 | Braegas ................ B60W 30/09 |
| | | 701/42 |
| 2010/0152972 A1 * | 6/2010 | Attard .................... G08G 1/165 |
| | | 701/44 |
| 2010/0283634 A1 | 11/2010 | Krautter et al. |
| 2011/0013201 A1 | 1/2011 | Scherl et al. |
| 2011/0099126 A1 | 4/2011 | Belani et al. |
| 2013/0057686 A1 | 3/2013 | Genc et al. |

\* cited by examiner

VEHICULAR INFORMATION SYSTEMS AND METHODS

CROSS-REFERENCE TO RELATED APPLICATIONS

This application is a continuation of U.S. Application Ser. No. 16/809,969 filed Mar. 5, 2020, now U.S. Pat. No. 11,663,916, issued May 30, 2023, which is a continuation of U.S. application Ser. No. 16/030,149, filed Jul. 9, 2018, now U.S. Pat. No. 10,657,815, issued May 19, 2020, which is a continuation of U.S. application Ser. No. 15/424,442, filed Feb. 3, 2017, now U.S. Pat. No. 10,043,389, issued Aug. 7, 2018, which is a continuation of U.S. application Ser. No. 14/841,085, filed Aug. 31, 2015, now U.S. Pat. No. 9,564,052, issued Feb. 7, 2017, which is a continuation of U.S. application Ser. No. 13/942,274, filed Jul. 15, 2013, now U.S. Pat. No. 9,123,245, issued Sep. 1, 2015, which is a continuation of U.S. application Ser. No. 13/639,755, filed May 13, 2010, now abandoned, which, is a national stage entry of PCT/US2010/034729, filed May 13, 2010, which claims the benefit of U.S. Provisional Application Ser. No. 61/177,710 filed May 13, 2009, the disclosures of which are hereby incorporated in their entirety by reference herein.

TECHNICAL FIELD

The present disclosure relates to vehicles, and more specifically to a method and system for obtaining and communicating vehicular information.

BACKGROUND

Parking space availability is a major problem in crowded areas, particularly urban areas. The importance of better parking systems in urban areas has been recognized recently as one of the most important avenues for betterment of urban infrastructure. One study estimated a loss of $78 billion in one year in the form of 4.2 billion lost hours and 2.9 billion gallons of wasted gasoline in the United States alone. Several projects recently have sought to address this issue through the design of mobile systems that collect traffic congestion information to improve route finding and trip planning. Unfortunately, a significant portion of traffic congestion and travel delays are experienced in downtown areas where it is not always possible to reroute a driver. In these densely populated urban areas, congestion and travel delays also are due to parking. In one study, researchers found in one small business district of Los Angeles that, over the course of a year, vehicles looking for parking created the equivalent of 38 trips around the world, burning 47,000 gallons of gasoline and producing 730 tons of carbon dioxide. Clearly, addressing the problems associated with parking in downtown areas would have significant societal impact, both economically and ecologically.

Prior attempts to solve this problem often have focused on monitoring the presence or absence of a vehicle over each parking spot using a dedicated sensor. These attempts typically rely on fixed sensors installed by municipalities in the ground or on parking meters. This results in a large fixed cost for installation and operation in order to cover parking spaces at a city-wide level (e.g., millions of dollars to cover a small percentage of the total number of parking spots).

As a result, there remains a need to better address problems associated with parking space availability.

SUMMARY

Addressing this problem does not necessarily require real-time identification of individual available parking spots. Instead there is also great value in collecting approximate parking statistics, for example aggregate counts of available parking spots on one road or historical averages of parking spot usage.

For example, such spatio-temporal statistics on parking availability is typically valuable to municipal governments to make better decisions about how to set prices for street-parking, setting time-limits, and where to install parking meters. Beyond adjusting road-side parking prices, detailed parking availability statistics could be widely disseminated on web-based maps or navigation systems which would incur the following further benefits:

(i) Improve traveler decisions, with respect to mode of transportation, the choice of road-side parking vs. parking garage, and in which area to search for road-side parking, (ii) (ii) Allow parking garages to adjust their prices dynamically to respond to the availability or non-availability of parking spaces in the immediate area, and (iii) (iii) Improve efficiency of parking enforcement by directing enforcement resources to areas where violations are most likely to incur.

In one aspect, a vehicular information system and method includes receiving, by a server computer, sensor information from each of a plurality of sensors. Each sensor in the plurality is associated with a vehicle. The sensor information includes location coordinates of each vehicle in the plurality. The server computer translates the sensor information associated with each vehicle in the plurality to parking statistics information (e.g., counts of spaces per road, fraction of roadway available for parking, historical averages for a road, etc.). In one embodiment, the translation is based on an aggregate of sensor information corresponding to the plurality of vehicles. In one embodiment, the server computer communicates the parking statistics information to the vehicle.

In one embodiment, the receiving of the sensor information includes receiving a range of the sensor and/or receiving a speed of the sensor. In one embodiment, the translating includes determining if each vehicle in the plurality is in a slotted parking area or in an unslotted parking area. If a vehicle is in the slotted parking area, the sensor information is translated to parking space counts. If a vehicle is in the unslotted parking area, the sensor information is translated to a parking space map. In one embodiment, the receiving of sensor information includes receiving video from a camera (e.g., a webcam) associated with each sensor in the plurality. The video can include a plurality of images that are time stamped.

In one embodiment, the receiving further includes determining that the location coordinates fall within a range of location coordinates associated with the start of the receiving. Stopping of the receiving step can occur when the location coordinates fall outside of the range of location coordinates associated with the start of the receiving. In one embodiment, the translating further includes determining the width of a dip in sensor information. The determining of the width can include determining a number of vehicles to which the dip corresponds, comparing the width to a threshold width, and/or determining the depth of a dip.

In one embodiment, the translation is based on an aggregate of sensor information corresponding to the plurality of vehicles. In one embodiment, a location estimate of the vehicle is corrected by matching time-series sensor information (sensor information collected over a period of time) to sensor information from prior trips along a road. In one embodiment, traces are aligned based on distinct signatures generated by fixed road-side objects. In one embodiment, the translating is based on continually comparing time-series sensor information observed by each sensor to a set of signatures known to correspond to typical vehicles. In one embodiment, the translating further includes calculating the parking statistics information over a predetermined period of time (e.g., average parking availability in a city block on a Saturday afternoon over the past month). In one embodiment, the parking statistics information calculated over the predetermined period of time is used to predict availability of parking (e.g., future availability or current availability).

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DETAILED DESCRIPTION

Figure 1:
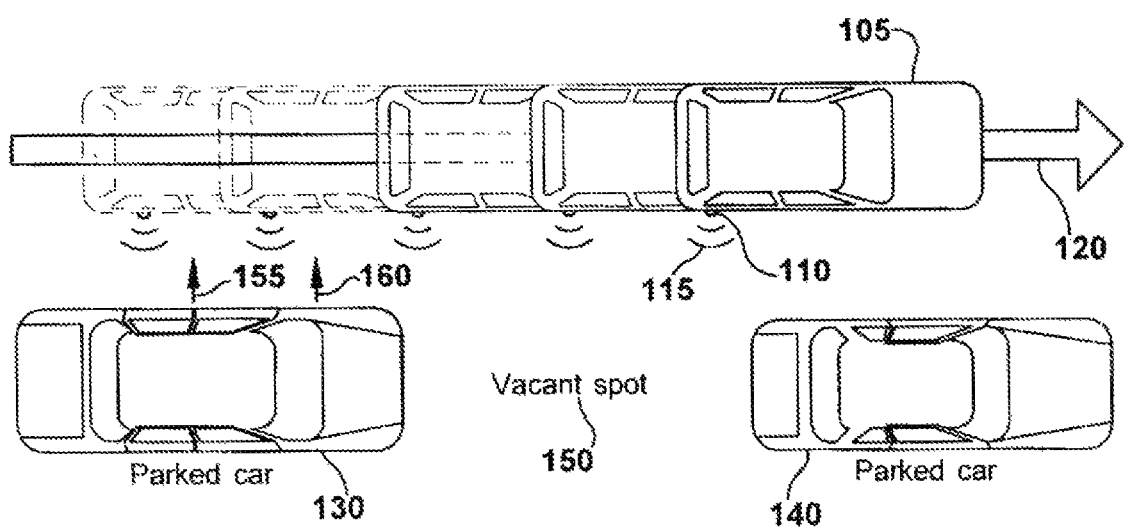
FIG. 1 is a block diagram of a vehicle having a sensor fitted on the vehicle in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, and some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

FIG. 1 is a block diagram of an embodiment of a vehicle 105 having a sensor 110 fitted on the vehicle 105. In one embodiment, the sensor 110 transmits sensor signals 115 as the vehicle drives along a lane 120 of a road. Next to the lane 120, there are two parked cars 130, 140 separated by a vacant spot 150. As the vehicle 105 drives, the sensor 110 transmits the sensor signals 115 and can receive one or more reflected sensor signals (e.g., reflected sensor signals 155, 160). For example, the sensor 110 receives a reflected sensor signal 155, 160 after the sensor signal 115 reflects off of one of the parked cars 130, 140. The presence of a reflected sensor signal 155, 160 as well as the time difference between when the sensor signal 115 is transmitted versus when the reflected sensor signal 155, 160 is received, affects the determination as to whether there is a vacant spot and the location of the vacant spot.

In one embodiment, the sensor 110 is an ultrasonic rangefinder and the vehicle 105 includes a Global Positioning System (GPS) (e.g., a Garmin 18-5 Hz GPS with 12 channel receiver). These are used to monitor road-side parking availability.

Figure 2A:
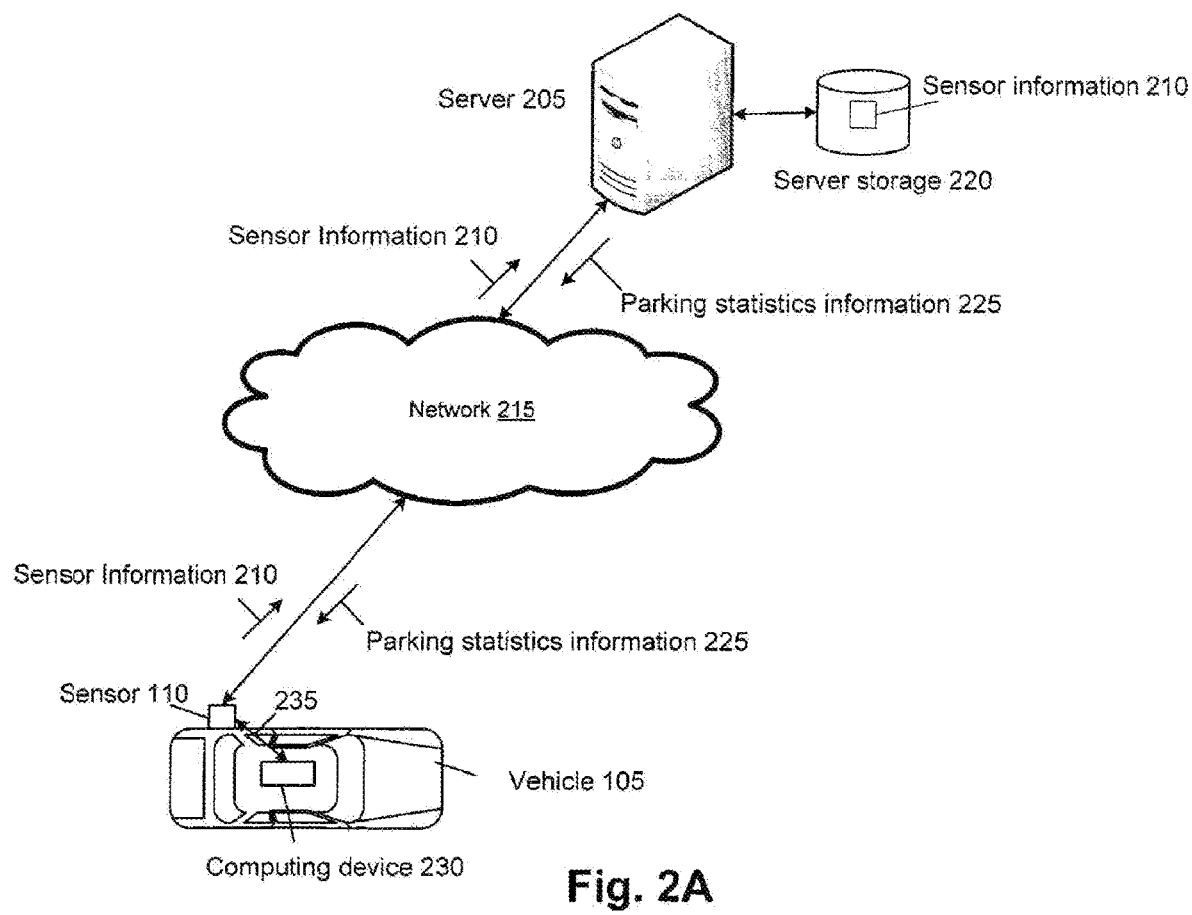
FIG. 2A is a block diagram of a vehicle having a sensor and a computing device communicating with a server over a network in accordance with an embodiment of the present disclosure.

Referring to FIG. 2A, in one embodiment, the sensor 110 associated with the vehicle 105 is in communication with a server computer (server) 205. The sensor 110 transmits sensor information 210 over a network 215 (e.g., a wireless network) to the server 205. Sensor information 210 is any information transmitted from the sensor and may include, for example, location information associated with the vehicle 105, information associated with received sensor signals 155, 160, information associated with sensor signals 115, time periods associated with one or more signals 115, 155, 160, speed of the vehicle 105, lane that the vehicle 105 is driving in, etc. In one embodiment, the server 205 stores the sensor information 210 in a server storage 220, such as a memory (e.g., RAM, ROM, etc.), hard drive, database, etc. In one embodiment, the server 205 analyzes the sensor information 210 and transmits parking statistics information 225 to the sensor 110 and/or vehicle 105. In one embodiment, the parking statistics information 225 is, for example, counts of spaces per road, fraction of roadway available for parking, historical averages for a road, available parking spots, etc. The vehicle 105 can then notify the driver or passenger of a vacant parking spot nearby. This notification can be a sound, spoken words, an indication on the vehicle's navigation system screen, on the vehicle's dashboard, etc.

In one embodiment, the vehicle 105 also includes a computing device 230 in communication with the sensor 110. The communication between the sensor 110 and the computing device 230 is represented by arrow 235. The computing device 230 may be internal to or external from the vehicle 105. For purposes of this disclosure (and as described in more detail below with respect to FIG. 16), a computer or computing device, such as the server 205 or computing device 230 within the vehicle 105, includes a processor and memory for storing and executing program code, data and software, which also may be tangibly stored or read from any type or variety of well known computer readable storage media, such as magnetic or optical discs or RAM-discs or tape, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 230 and/or server 205 can, in one embodiment, also include a display, such as a screen or monitor.

Figure 2B:
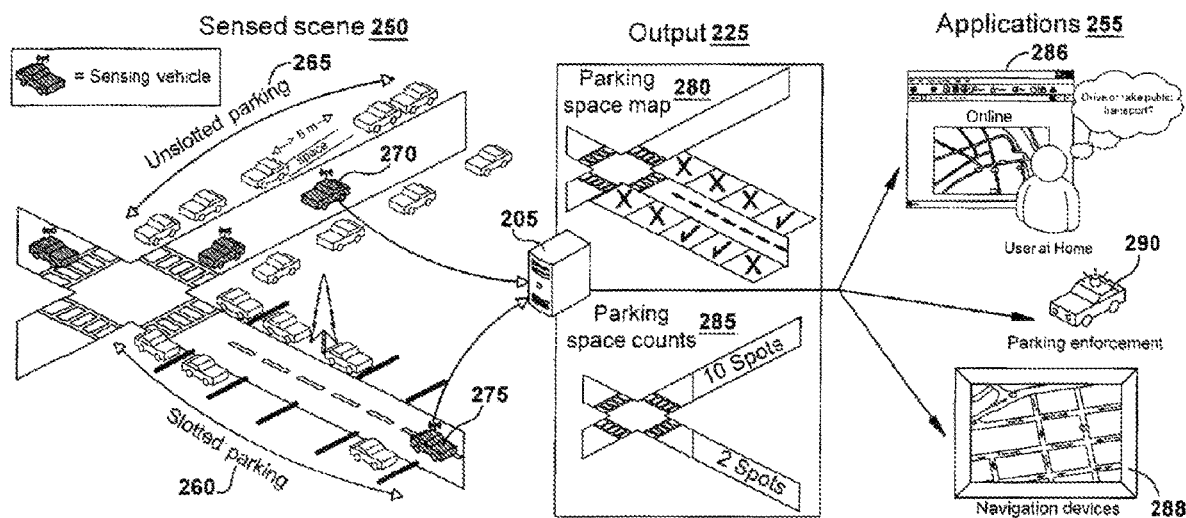
FIG. 2B is a block diagram of a sensed scene, the parking statistics information output, and applications of the output in accordance with an embodiment of the present disclosure.

FIG. 2B shows a block diagram of a sensed scene 250, parking statistics information output 225, and applications 255 of the output 225. To define concrete parking metrics, it is helpful to distinguish areas where vehicles are arranged in slots with demarcated parking bays (often separated by lines marked on the road), which are referred to herein as slotted areas (e.g., slotted parking 260), from areas without any marked parking spots, which are referred to herein as unslotted (e.g., unslotted parking 265). Slotted parking spaces 260 typically are used where parking meters or other parking pay stations are installed. In such areas, it typically is easier to measure the number of available parking spaces, because the spacing between cars is regulated. Vehicles such as vehicles 270, 275 drive along the road and transmit the sensor information 210 to the server 205. In one embodiment, the server 205 aggregates the data from different vehicles 270, 275 and outputs a parking space map 280 and/or parking space counts 285. In one embodiment, the server 205 then enables the user to access this information online via a display 286 of a computer (e.g., when the user is at home), may transmit this information to a navigation device 288, may communicate the information via the radio or television, or may transmit this information to designated parking enforcement vehicles 290.

Figure 3:
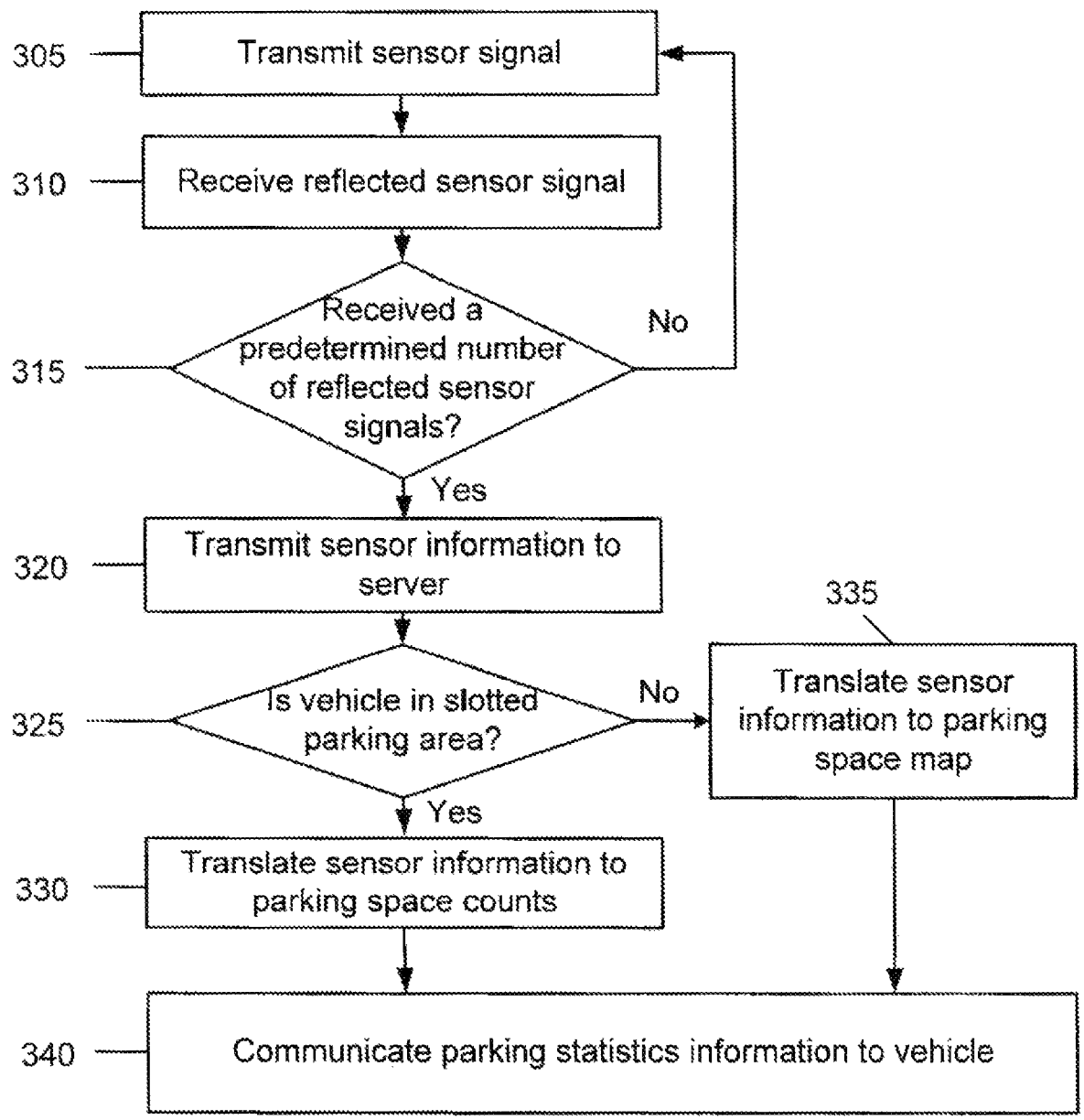
FIG. 3 is a flowchart illustrating the steps performed by the server of FIG. 2A in accordance with an embodiment of the present disclosure.

FIG. 3 is a flowchart illustrating an embodiment of the steps performed by the vehicle 105 and server 205 in conjunction with the sensor 110 to detect available parking spots. As stated above, the sensor 110 transmits a sensor signal 115 (step 305) and receives a reflected sensor signal 155, 160 (step 310). In one embodiment, the vehicle 105 determines if it has received a predetermined number of reflected sensor signals in step 315. If not, the vehicle 105 returns to step 305 (or step 310) and transmits (or receives) another sensor signal 115 (reflected sensor signal). If so, the vehicle 105 transmits the sensor information 210 to the server 205 (step 320). The server 205 aggregates the sensor information 210 for a plurality of vehicles and translates, based on this aggregation of sensor information 210, the sensor information associated with each vehicle in the plurality to parking statistics information.

In one embodiment, the server 205 determines from the sensor information 210 (e.g., GPS coordinates) if the vehicle 105 is in a slotted parking area or an unslotted parking area (step 325). If the vehicle 105 is in a slotted parking area, the server 105 translates the sensor information 210 to parking space counts (step 330). If the vehicle 105 is in an unslotted parking area, the server 105 translates the sensor information 210 to a parking space map (step 335). The server 205 then communicates the corresponding parking statistics information 225 to the vehicle 105 (step 340).

Figure 4:
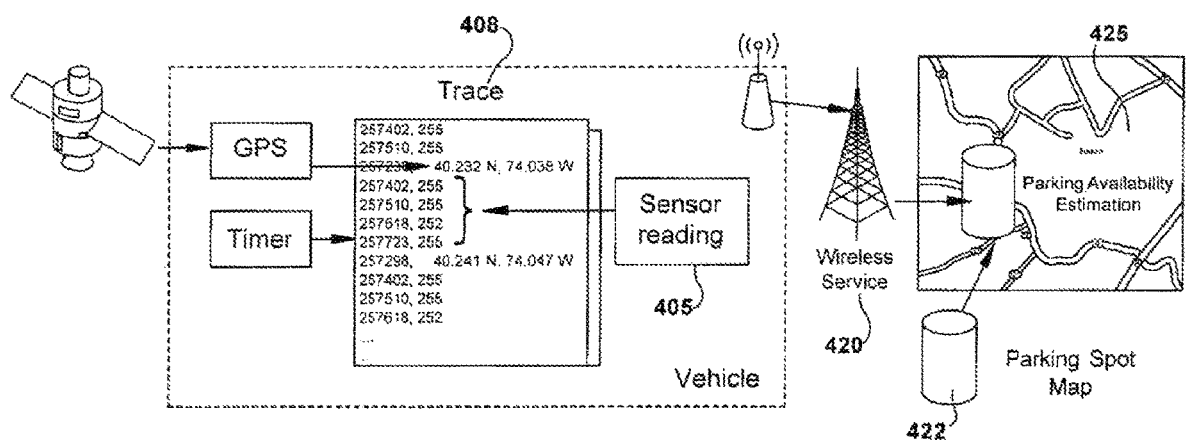
FIG. 4 is a block diagram of the sensor information obtained by a sensor of a vehicle being transmitted via a wireless service in accordance with an embodiment of the present disclosure.

Referring to FIG. 4, several sensor-equipped vehicles transmit their sensor readings 405 (sensor information 210) to server 205. A trace 408 of sensor readings for a vehicle 105 is shown. In one embodiment, the trace 408 includes GPS readings and timer readings. In one embodiment, the sensor readings are transmitted to the server 205 via a wireless service 420. In one embodiment, the server 205 combines this sensor information 210 with information from a parking spot map 422 to create an estimate of road-side parking availability 425. In one embodiment, the parking spot map 422 may be available in different levels of detail. Vehicles can report their data 405 over a cellular uplink but opportunistic use of Wifi connections also is possible depending on cost/delay tradeoffs. The parking availability information then can be distributed, such as, for example, to navigation systems or distributed over the Internet. In one embodiment, the parking spot map 422 is constructed manually from satellite imagery. In another embodiment, the parking spot map 422 is generated automatically through aggregation of sensor data over time periods of weeks to months. For example, spaces that almost never have cars parked are likely to be invalid parking spaces (e.g., driveways, storefronts, illegal parking spots such as fire-hydrants, etc., or portions where parking is not allowed), while spaces that always have a car parked are very likely not parked cars, but some other immovable object.

In one embodiment, each sensor vehicle 105 carries a passenger-side facing ultrasonic rangefinder to detect the presence or absence of parked vehicles. In one embodiment, its range is equal to at least half the width of urban roads and the sampling rate is high enough to provide several samples over the length of a car at maximum city speeds. In one embodiment, the ultrasonic rangefinder is magnetically mounted to the side of the vehicle 105.

In one embodiment, the ultrasonic rangefinder is a Maxbotix WR1 waterproof rangefinder. This sensor emits sound waves every 50 ms at a frequency of 42 KHz. The sensor provides a single range reading from 12 inches to 255 inches every cycle, which corresponds to the distance to the nearest obstacle or the maximum range of 255 inches if no obstacle is detected. In one embodiment, the sensor measurements at each vehicle 105 are time-stamped and location-stamped with inputs from a 5 Hz GPS receiver, producing the following sensor information 210:

<Kernel-time, range, latitude, longitude, speed>

In one embodiment, vehicles transmit a collection of these measurements (a trace 408) to the server 205. The server 205 continuously aggregates and processes this sensor information using probabilistic detection algorithms. Other sensor options also exist.

In one embodiment, to obtain ground truth information (to determine what is located on the ground at a parking spot) for system evaluation purposes and to be able to analyze erroneous readings, a webcam (e.g., a Sony Playstation 3 Eye webcam) is integrated into the passenger-side sensor mount. In one embodiment, to avoid angular and shift errors with respect to the sensor, the camera is mounted just above the sensor and its orientation is aligned to the sensor. In one embodiment, the associated program captures about 20 frames per second (fps) and tags each image with a kernel time stamp. This time stamp links images to the sensor records obtained at approximately the same time. Each image then is inspected (e.g., manually) and the ground truth sensor data is entered. This can facilitate the determining of the estimated aiming of the ultrasound sensor for error checking purposes.

Figure 5:
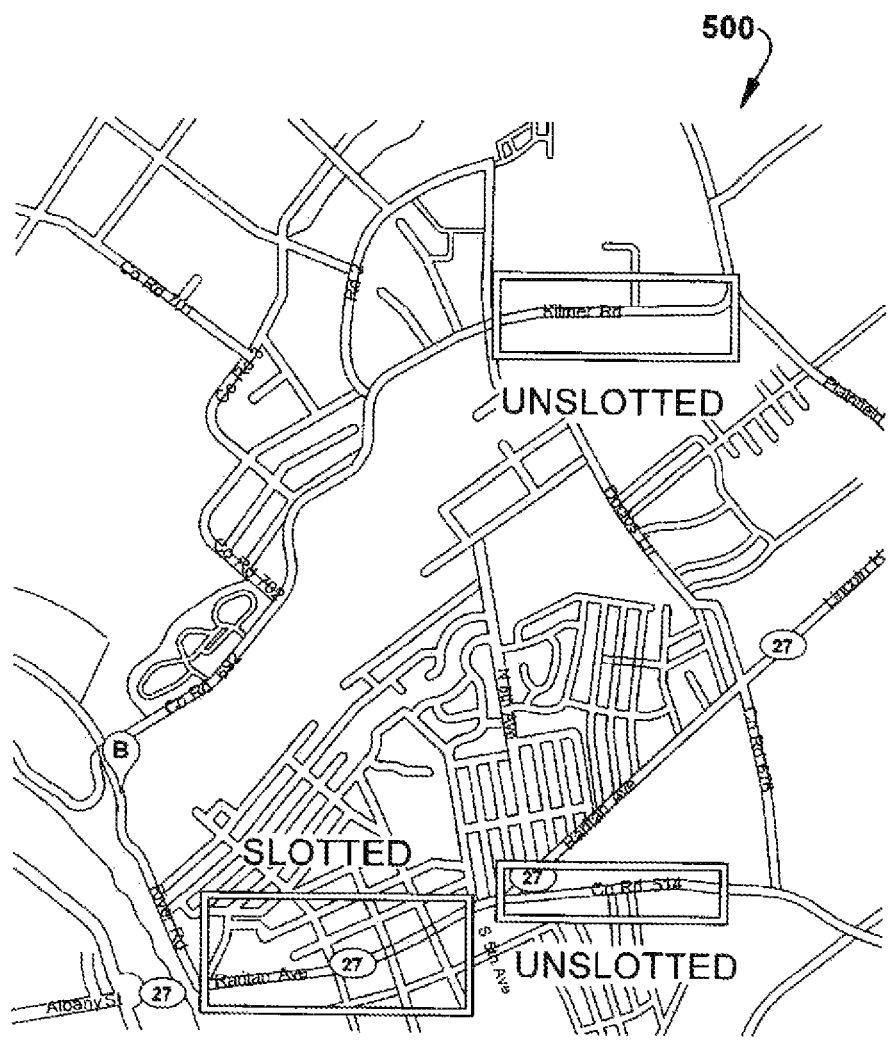
FIG. 5 shows parking regions to which data collection is limited in accordance with an embodiment of the present disclosure.

FIG. 5 shows an embodiment of parking regions 500 for data collection. These parking regions were selected to use as a sample due to the relatively small areas of roadside parking on one commute trip and the large volume of video data involved. In one embodiment, the activation and deactivation of data collection is implemented in the system by using the idea of a tripbox. Tripboxes represent rectangular areas defined by two (latitude, longitude) points. Each tripbox also is associated with an entry and an exit function, which starts and stops data collection, respectively. In one embodiment, the tripbox daemon reads the current GPS coordinates from the GPS receiver and checks whether they fall inside or outside the tripbox region. If the current coordinates are the first instance of the mobile node inside the tripbox, it triggers the entry function. In case the mobile node is already inside the tripbox and the next received coordinates are outside this region, it triggers the exit function. In one embodiment, tripboxes are used because they simplify the handling of vehicle routes, which might enter a parking zone from an unexpected direction, or the acquisition of a GPS fix while already inside a trip box.

In one embodiment, since GPS coordinates can oscillate due to positioning errors, the tripbox implementation can include a guard distance and a guard time to avoid repeatedly triggering the same tripbox functions. The guard distance is a minimum distance that must be traveled between two tripbox boundary crossings. Similarly, the guard time is the minimum time that must be spent before the next tripbox function can be triggered. This avoids triggering the start and the stop functions repeatedly due to GPS errors.

Figure 6A:
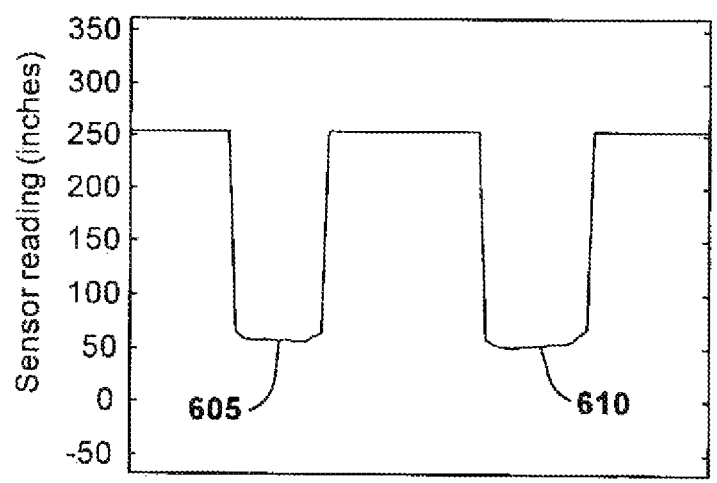
FIGS. 6A and 6B shows examples of a trace produced by the sensor as a sensing vehicle drives past two parked cars in accordance with an embodiment of the present disclosure.

In one embodiment, the server 205 (or, in another embodiment, the vehicle 105) then executes a detection algorithm to detect available parking spots. The detection algorithm translates the ultrasound distance-reading trace into a count of available parking spaces. The distance-reading trace provides a one-dimensional view of the distance to the nearest obstacle as the sensing vehicle 105 moves forward. FIG. 6A shows an example of the trace produced by the sensor 110 as a sensing vehicle 105 drives past two parked cars. In one embodiment, the width of a dip 605, 610 is representative of the length of a parked car, although the errors in location estimates obtained from a GPS receiver can distort the true length of the car in a somewhat random manner. In one embodiment and as described in more detail below, it is assumed that maps of areas with street-parking slots are available from a second source.

Figure 6B:
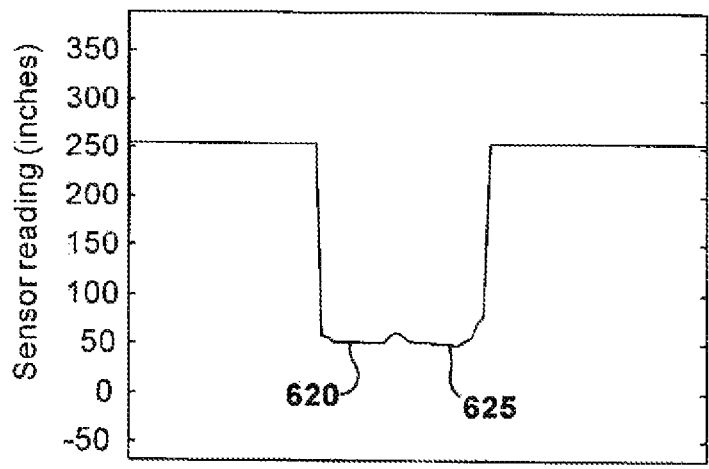

An ultrasonic sensor does not have a perfectly narrow beam-width, but instead the beam width of the sound waves emitted widens with distance. This implies that the sensor receives echos, not just from objects that are directly in front, but also from objects that are at an angle. This can affect how the sensor 110 perceives vehicles that are parked very close to each another. Instead of clearly sensing the gap between these vehicles, the "dips" in the sensor reading can become merged, as depicted in dips 620, 625 of FIG. 6B. Still, classification of the spatial width of the dip allows one to determine the number of cars to which a dip corresponds.

The inaccuracy of latitude and longitude values obtained from the GPS unit adds another challenge to the detection problem. The location estimate provided by a commercial grade GPS receiver suffers from well known errors. Without a priori knowledge of how the GPS error varies in space and time, it is possible that GPS errors can make a parked car appear to be shorter or longer than its true length. Since the detection of parked vehicles depends upon distinguishing objects that are about the length of a car from other, smaller obstacles in the sensor's path (such as trees, recycle bins, people, etc.), the detection sometimes leads to false alarms (i.e., dips caused by objects other than cars to be classified as parked cars), and missed detections (i.e., parked vehicles to be classified as something other than a parked car).

With respect to the detection algorithms, in one embodiment a slotted model exists and an unslotted model exists.

Slotted model: Each dip in the sensor trace has a depth and a width that correspond to the distance from the sensor 110 to the object causing the dip, and the size of the object in the direction of motion of the sensing vehicle 105. The sensor trace first is pre-processed to remove all dips that have too few readings (less than 6 sensor readings, assuming a maximum speed of 37 mph and a car length of 5 meters) and could not possible have arisen from a parked car. To detect a parked car, in one embodiment the width and depth of each dip in the sensor reading is compared against thresholds. These thresholds can be determined using training data.

In one embodiment, training data refers to a recording of spatial width and depths of dips produced by vehicles. In one embodiment, training data is collected using the webcam, which allows the visual determination of whether the sensor is pointed at a vehicle at any given point in time and thereby enables association of a given dip with an actual parked vehicle.

Figure 7:
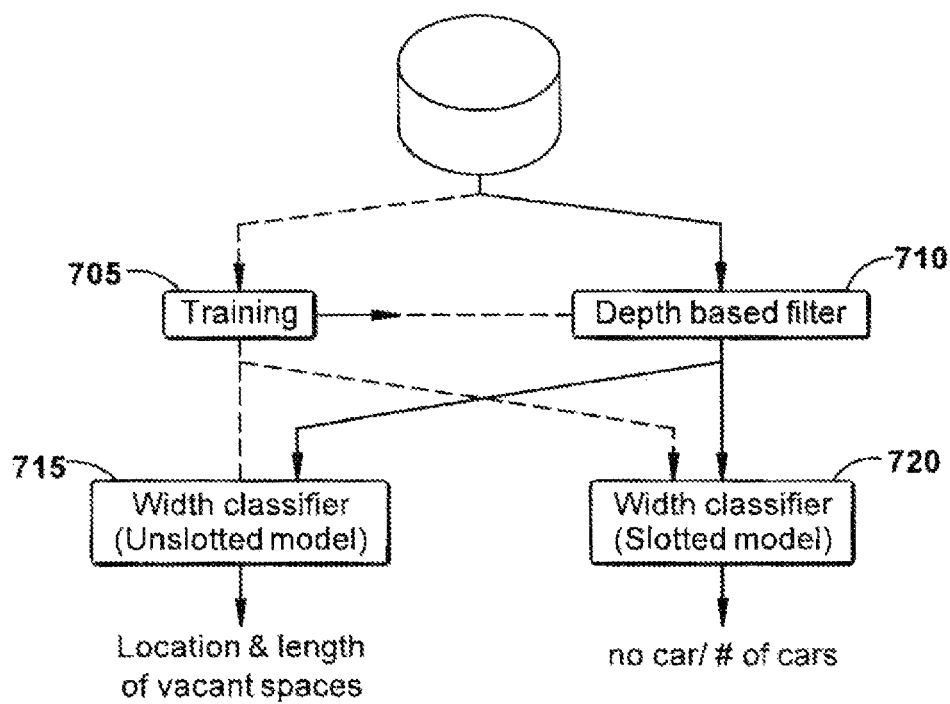
FIG. 7 is a flowchart illustrating filtering stages applied to each detected dip of a sensor reading in a trace in accordance with an embodiment of the present disclosure.

FIG. 7 shows a series of filtering stages that are applied to each detected dip in the sensor reading. In particular, there is a training stage 705 that is applied to a depth based filter 710. The depth based filter 710 and the training stage 705 is applied to a width classifier (unslotted model) 715 and a width classifier (slotted model) 720. The width classifier (unslotted model) 715 outputs the location and length of vacant spaces. The width classifier (slotted model) 720 outputs a number of cars or no car. In one embodiment, 20% of the data is used to train the model and the remaining 80% of the data is used to evaluate its performance.

Figure 8:
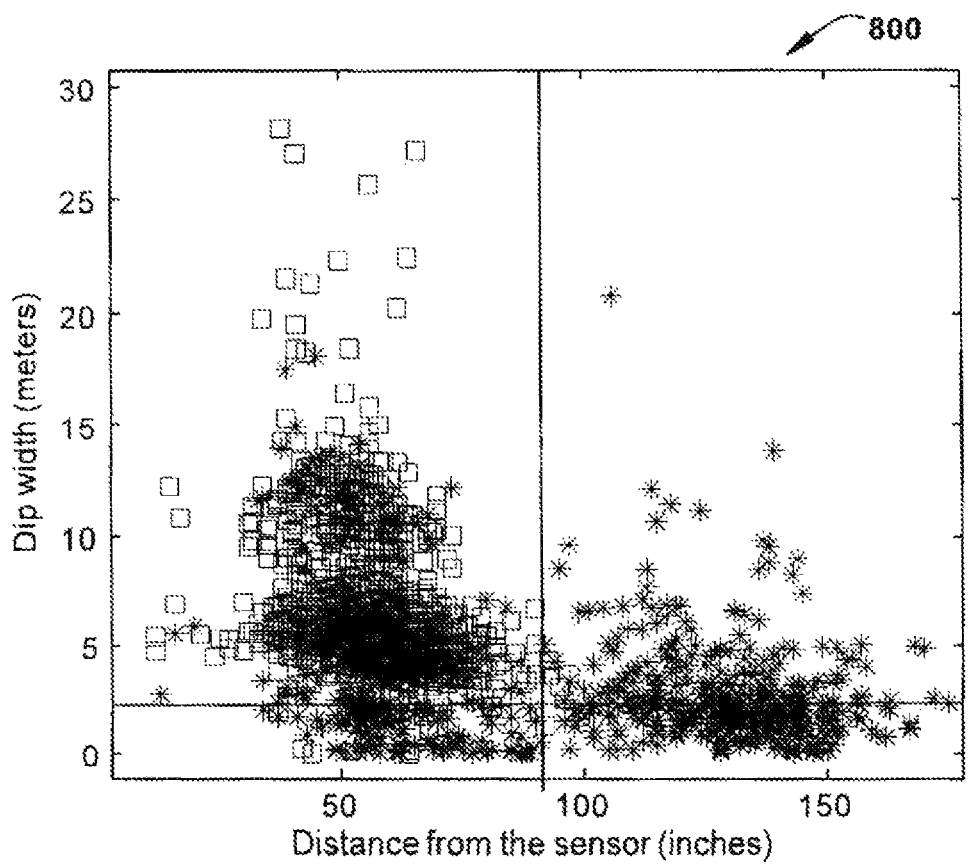
FIG. 8 is a plot of a depth and width of peaks observed in 19 separate trips in an area with slotted parking in accordance with an embodiment of the present disclosure.

FIG. 8 shows an embodiment of a plot 800 of the depth and width of the peaks observed in 19 separate trips in an area with slotted parking. In particular, plot 800 is a plot of the depth and width of most prominent dips observed in the sensor reading, caused by parked cars (squares) and objects other than cars (stars). This data set is used for training the model used for classifying the rest of the data. In one embodiment, this data is used jointly for picking thresholds for the depth and width of a sensor-reading dip that provide the minimum overall error rate (e.g., the sum of the false positive rate and the miss detection rate). In one embodiment, these thresholds were determined to be 89.7 inches for the depth and 2.52 meters for the width, resulting in an overall error rate of 12.4%.

In one embodiment, all remaining dips are checked for spatial width, and compared against a threshold representing the typical length of a car. For this, the interpolated GPS coordinates belonging to the starting and ending sample of the dip are converted to UTM (meters) and the distance in meters between the starting and ending sample is computed. Since some dips correspond to multiple cars parked very close together, in one embodiment, dips of a width greater than twice the threshold for one car are classified to belong to two cars, and so on. This allows the counting of the number of cars on a stretch of road. Subtracting this from the total number of slots on the road, as given by the map, provides an estimate of the number of vacant spaces.

Unslotted model: For the unslotted parking model, the number of cars that can be accommodated on a given stretch of road depends upon the manner in which cars are parked on it at any given instant of time. Since each successive pair of parked cars in this model can have a variable amount of space between them, in one embodiment, the space between successive parked cars is estimated to determine whether the space is large enough to accommodate one or more cars. To accomplish this, in one embodiment, the sensor trace is used to estimate the spatial distance between dips that have been classified as parked cars. The estimated length of the vacant stretch then is compared against the length of a standard parking space (which, in one embodiment, is assigned a value of 6 meters).

In one embodiment, slotted and unslotted street-parking models are handled separately. Further, in one embodiment, it is assumed that it is easy to obtain information about which streets have which type of parking as prior knowledge. For the slotted model, detecting how many of the parking spaces on a road segment are vacant is of interest.

For example, it is assumed that a street segment with the slotted parking model is known to have N parking slots and that at a given instant of time, n of these slots are vacant. A sensing vehicle that drives through this street determines that n^ of the slots are vacant. The value of n^ can differ from n due to missed detections as well as false positives. In one embodiment, the missed detection rate (pm) is of interest, i.e. the probability that a parked car is not detected. Further, the false positive rate (pf) is also of interest, i.e. the probability that there is no parked car in a given slot but the detection algorithm detects one. The ratio n^/n captures the performance of the detection algorithm in estimating the number of vacant spaces. This ratio can be smaller or larger than 1, for a given run, depending on whether there are a greater number of missed detections or false positives. In one embodiment, since the thresholds for dip classification are chosen from the training data to minimize the overall error rate, and this is known to occur when the probability of false alarm equals the missed detection probability, it is expected that the ratio n^/n has a mean close to 1.

For the unslotted model, in one embodiment, the appropriate metric of interest is: 'How many more cars can be accommodated on a given road segment, given the cars that are presently parked on it?'. As described above, estimating this number uses estimation of the space between parked cars. As in the slotted parking model, it is assumed that the locations of stretches where unslotted parking spaces are available is known and the detection algorithm is executed over such stretches. Whenever the detection algorithm ascertains that a space between two parked cars is large enough to accommodate another car, it records the estimated space d̂. Suppose the actual space between the cars is d, then d̂ can be larger or smaller than d and, as before, the measure of accuracy is taken to be d̂/d. Further, the miss detection rate $p_m$, is of interest, i.e. the probability that the algorithm decides that there isn't enough space for a single car, when there actually is, and the false positive rate p f, is also of interest, i.e. the probability that the detection algorithm declares that one or more cars can be accommodated in a space between two parked cars, whereas in reality there is not enough space for a single car. In one embodiment, it is assumed that a vehicle of length 5 meters and at least half meter on either side for parking, for a minimum of 6 meters, qualifies for a parking space.

Figure 9:
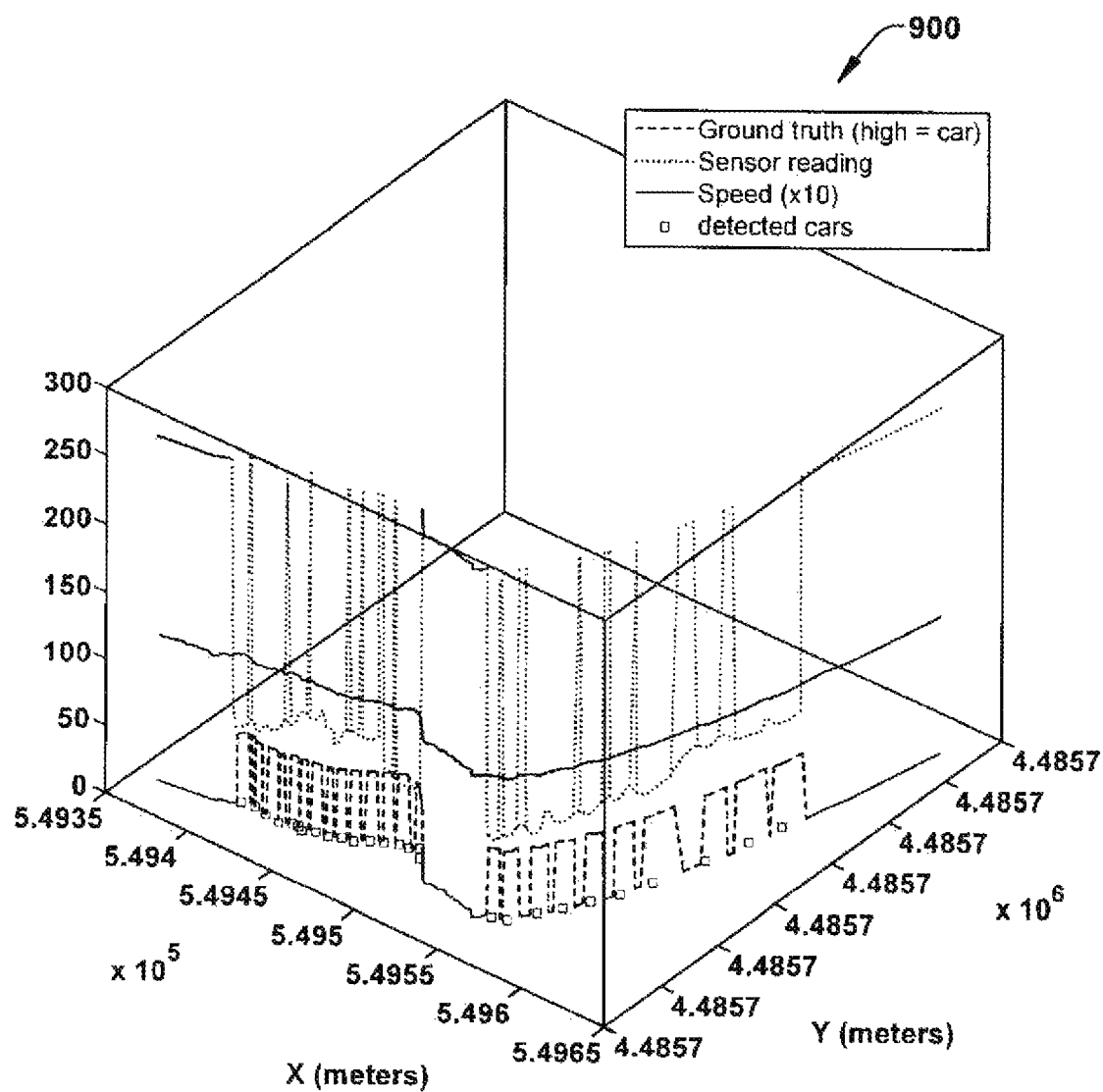
FIG. 9 is a plot showing the sensor reading and ground truth, speed, and output of the detection algorithm in accordance with an embodiment of the present disclosure.

In one embodiment, to evaluate the detection algorithm, the images recorded by the webcam are utilized. Since the webcam records images at a rate of 21 frames per second, it matches the rate at which sensor readings are recorded fairly well. Each image is labeled manually based on whether the center of the image has a car in front or not. The time stamp associated with each image allows the interpolation of a location stamp for each image. This provides the ground truth for the training data set and the evaluation data set. FIG. 9 is an exemplary plot 900 showing the sensor reading (dotted line) and ground truth (dashed line, high=car, low=no car), speed (increased in magnitude by ×10 for visual clarity), and the output of the detection algorithm (squares).

Figure 10A:
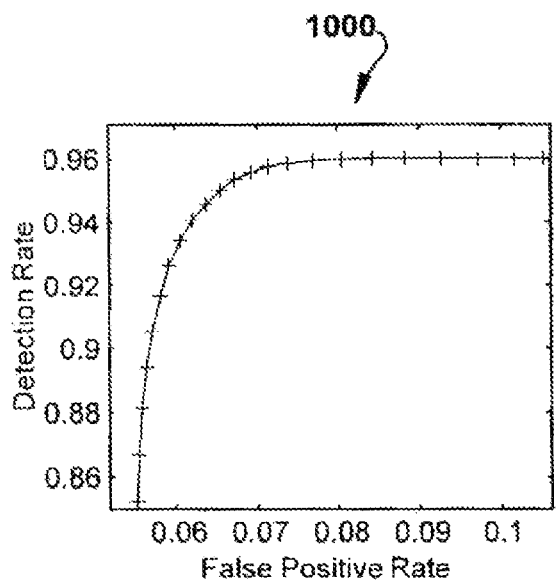
FIG. 10A is a plot illustrating the tradeoff between detection rate and false positives for a slotted model, as the threshold for the width of a dip is varied in accordance with an embodiment of the present disclosure.
Figure 10B:
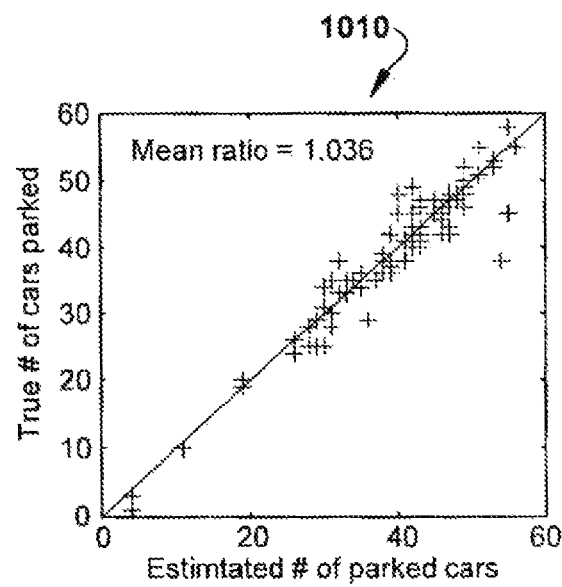
FIG. 10B is a plot of the number of detected parked vehicles on a road with 57 parking slots, against the true number of parked cars in accordance with an embodiment of the present disclosure.

FIG. 10A shows a plot 1000 illustrating the tradeoff between detection rate and false positives for the slotted model, as the threshold for the width of a dip (i.e. corresponding to the length of a car) is varied. In one embodiment, a threshold of 2.5 meters provides the best tradeoff in the minimum probability of error sense. FIG. 10B shows a plot 1010 of the number of detected parked vehicles on a road with 57 parking slots, against the true number of parked cars. On average, the ratio of the estimated number of cars to the true number of cars is approximately 1.036, indicating a fairly good estimator of the availability of free spaces.

Figure 11A:
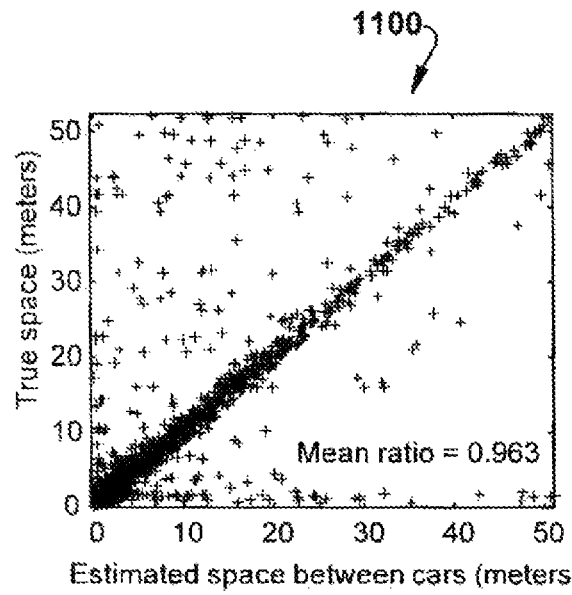
FIG. 11A shows a scatterplot indicating a comparison for an unslotted model between the estimate of space between two successive cars with the true value as computed using a ground truth in accordance with an embodiment of the present disclosure.
Figure 11B:
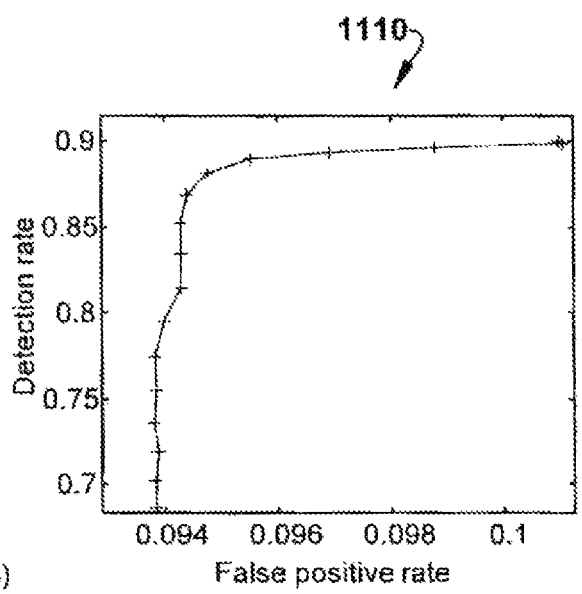
FIG. 11B shows a plot indicating the trade-off between corresponding false positive rate and missed detection rate as the threshold for the width of a dip is varied in accordance with an embodiment of the present disclosure.

For the unslotted model, the estimate of space between two successive cars is compared with the true value as computed using the ground truth generated by the tagged video images. FIG. 11A shows this comparison as a scatterplot 1100. The estimated space is on average 96% of the true space. Further, the estimated space is compared with the length of a typical parking slot (usually about 6 meters) to determine whether an additional car can be accommodated. The result of this detection leads to false positives and missed opportunities, and the trade-off between the corresponding false positive rate and missed detection rate is shown in a plot 1110 of FIG. 11B, as the threshold for the width of a dip is varied.

While the counting of available parking spaces does not require high absolute position accuracy, creating an occupancy map of parking increases accuracy requirements since a detected car has to be matched to a spot on a reference map. In one embodiment, the location coordinates provided by a GPS receiver are typically accurate to 3 m (standard deviation) when the Wide Area Augmentation System (WAAS) service is available. Given a parking spot length of about 7 m, one can expect a significant rate of errors—any error greater than 3.5 m could lead to matching a vehicle to an incorrect adjacent spot.

To address the occupancy map challenge, an occupancy map creation algorithm is used that exploits both patterns in the sequence of parking spots, as well as an Environmental GPS position correction method, to improve location accuracy with respect to the parking spot map. In one embodiment, the error in GPS coordinates is studied based on how it behaves as a function of distance. The positioning accuracy of a GPS receiver is affected by several factors, including ionospheric effects, satellite orbit shifts, clock errors, and multipath. Ionospheric effects typically dominate the other error sources, except for errors that experience satellite occlusion (e.g., in urban canyons). Ionospheric effects remain similar over distances of several 10s of kilometers and they contain significant components whose rate of change is on the order of tens of minutes or longer. GPS errors therefore can be expected to be correlated in time and space. However, the Wide Area Augmentation System was designed to reduce these ionospheric and some other errors, raising the question whether the resulting GPS errors with WAAS still exhibit strong spatio-temporal correlation.

In one embodiment, the GPS error is highly correlated at short distances, and the correlation tapers off with distance. Motivated by this observation, the server (or vehicle) executes a method to improve absolute location precision by an environmental fingerprinting approach. In particular, the sensor reading is used to detect certain fixed objects that persistently appear in the ultrasound sensor traces, and utilize these to correct the error in the GPS trace. To validate the approach, it is tested on the slot-matching problem described above. It is expected that the environmental fingerprinting approach will benefit any mobile sensing application that requires precise estimates of location or distance between two points, as is the case in some of the scenarios in the sensing application.

In one embodiment, certain fixed objects (such as trees, recycle bins, the edges of street signs, etc., which also would be picked up by the sensor) are location-tagged in the video traces on a given street over multiple different runs from different days. The data is tagged with the same video tagging application developed for evaluating the detection algorithm. It was determined that the tagged coordinates for a given object from multiple runs varied significantly. Using 29 different runs and 8 objects on a street, the standard deviation of error was found to be 4.6 m in the X-direction and 5.2 meters in the Y-direction. The error due to variation in the lateral position of the sensing vehicle was not corrected, because the street chosen for this was narrow enough to allow the lateral variation to be within ±½ meter. Also this street was almost parallel to the X axis and so a larger error in the Y direction to slight variations in the sensing vehicle's lateral position was expected to be observed.

Figure 12:
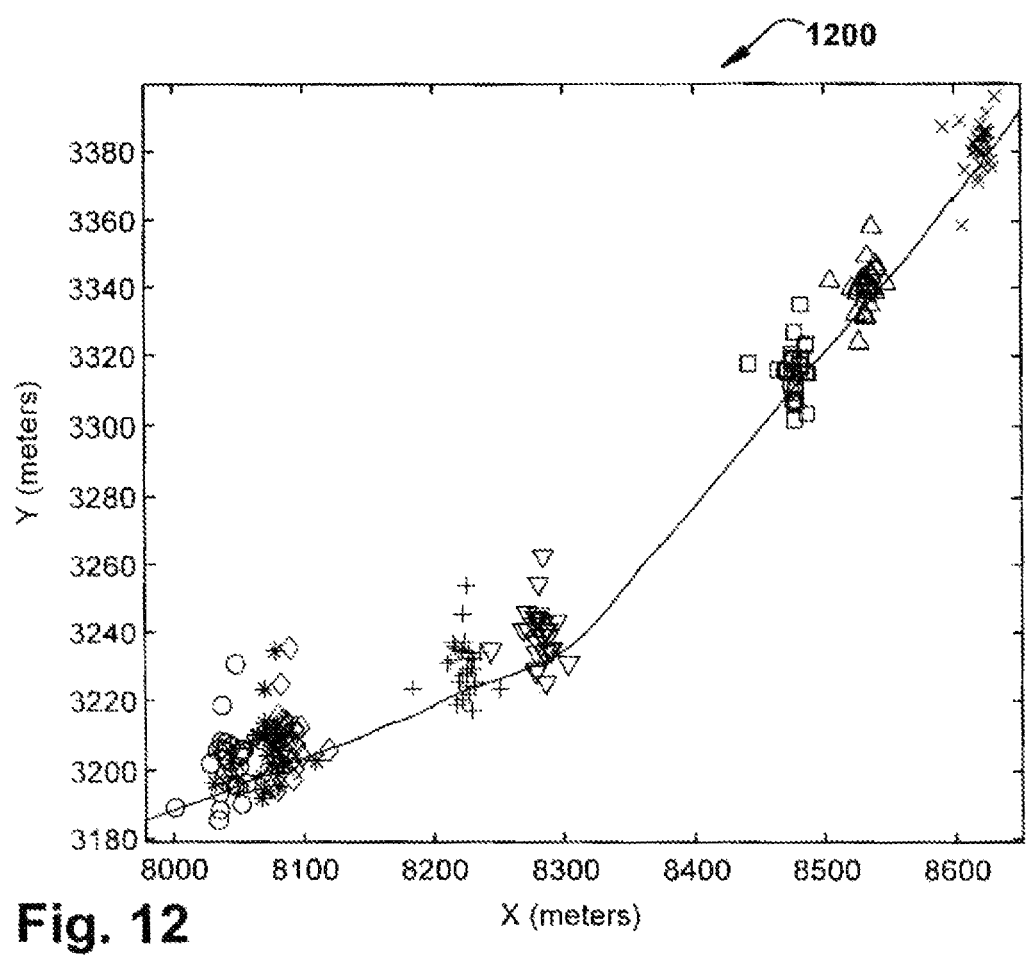
FIG. 12 is a plot of the locations of eight objects along a street in accordance with an embodiment of the present disclosure.
Figure 13:
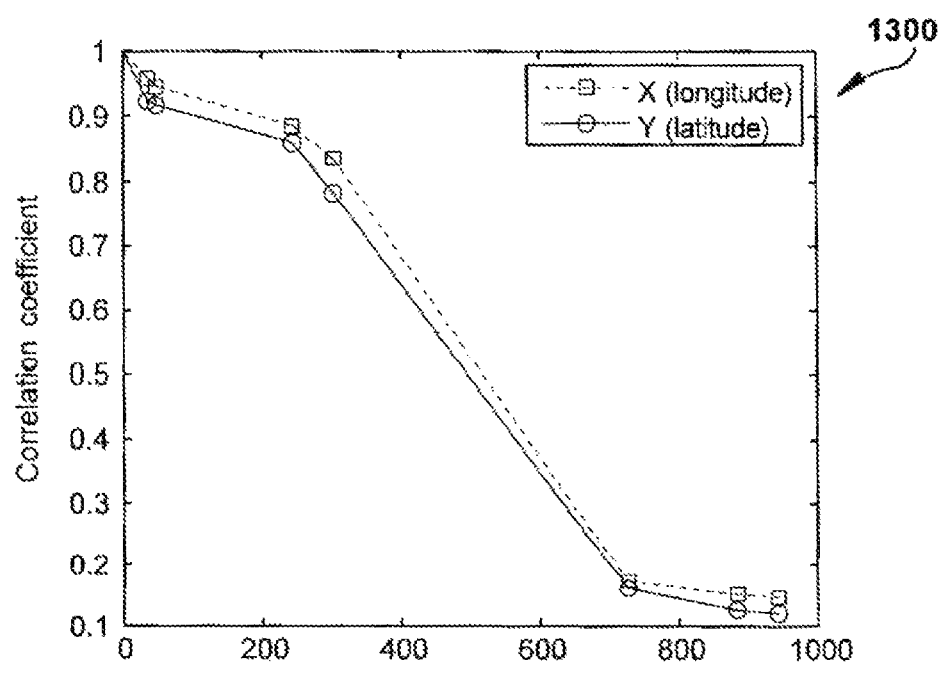
FIG. 13 shows a plot of the correlation between the error in the X and Y directions as a function of distance along the street, using the eight objects selected in accordance with an embodiment of the present disclosure.

In one embodiment, the error between GPS coordinates is correlated from one object to the next. FIG. 12 shows a plot 1200 of the locations of the 8 objects along the street. In one embodiment, the centroid of the 29 tagged locations is chosen for each object as the reference location and each tagged location coordinate is subtracted to compute the error. FIG. 13 shows a plot 1300 of the correlation between the error in the X and Y directions as a function of distance along the street, using the 8 objects selected. In one embodiment, the correlation in the error is fairly high for a distance of up to 250 meters.

Figure 14:
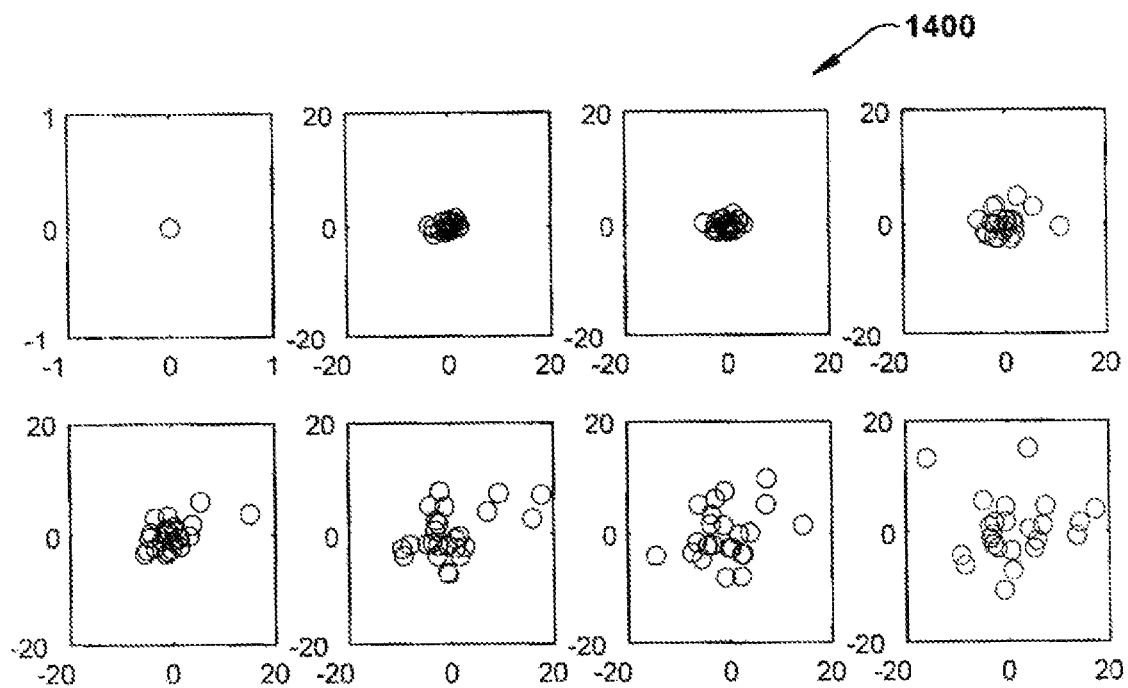
FIG. 14 is a plot illustrating the use of the first object of FIG. 12 to correct the error of the remaining seven objects in accordance with an embodiment of the present disclosure.

The above investigation suggests that if the GPS error is corrected at a given point, then it is likely to remain corrected for an appreciable distance. In plot 1400 of FIG. 14, the location-stamp of the first object on the street (lower left corner in FIG. 12) is used to correct the errors in the location of the remaining 7 objects. As FIG. 14 illustrates, the residual error in the error-corrected location-stamp for the 7 objects increases with increasing distance from object 1.

Fingerprinting the environment by relying on features in the sensor trace that are produced by fixed objects in the environment provides a possible means to improve location accuracy beyond that provided by GPS alone. However, fingerprinting a street requires multiple traces from that street, from which the locations of objects that are likely fixed can be determined.

Estimating the GPS error using the sensor trace involves a task comparing the reported location of the pattern (dips) produced by a series of fixed objects to the a priori known location of this pattern (as determined from multiple previous traces from the same road segment). The offset between the two gives an estimate of the error in the reported location.

For example, to detect the dips corresponding to two successive fixed objects from an experimental trace, a set of candidate dips is identified for each object from the dips that are not classified as vehicles. Each candidate set consists of dips within a radius of 20 meters of the known mean location of the fixed object (mean computed from past traces). One dip then is selected from each candidate set so that the distance between the successive selected dips best matches the known distance between the mean locations of the objects to which they correspond. The vector offset between the known locations and the reported locations of the objects is the GPS error estimate. The correction procedure is repeated with another set of objects once the vehicle travel distance has exceeded the correlation distance.

Form such objects, $i=1, \ldots m$, the location stamps $li(x, y)$ of the dips corresponding to each object is recorded. These then are subtracted from the known true location of the object $ti(x, y)$ (assuming the centroid of the 29 locations as above), giving an estimate of the error vector $ei(x, y)=ti(x, y)-li(x, y)$. Next, this error vector from a given object is added to the location estimates of detected cars that are detected to be within 100 meters of this object.

Motivated by the observation of correlation between GPS error in space, the specific application of matching detected parked cars to their respective slots on a street with slotted parking has been observed. To accomplish this, the output of the algorithm for detecting cars in the slotted model (see FIG. 7) was augmented with the estimated location of each detected car. In one embodiment, the locations of 57 slots on a street were determined using a satellite picture from Google Earth. The matching of cars to slots is an instance of the assignment problem on bipartite graphs and can be solved efficiently using the Hungarian algorithm (a combinatorial optimization algorithm which solves an assignment problem in polynomial time). The problem involves assigning each detected parked car with specified location coordinates in the set of detected cars, to a valid slot from among the set of 57 slots available. The criterion for the assignment is the minimization of the cumulative distance between each car and its assigned slot. In one embodiment, a MATLAB implementation of the Hungarian algorithm is used to solve for the slot-matching of detected parked cars.

Figure 15:
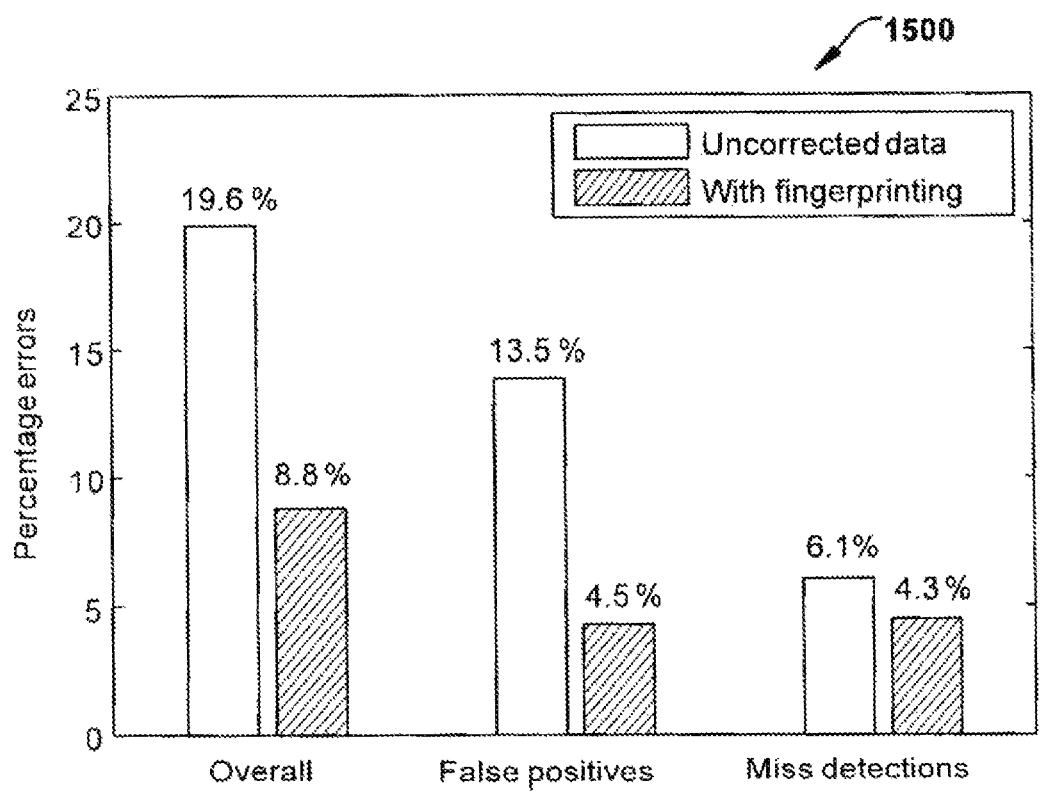
FIG. 15 is a plot of the error-performance of the slot-matching algorithm when using plain uncorrected traces and with traces that have been corrected using the fingerprinting algorithm in accordance with an embodiment of the present disclosure.

FIG. 15 shows a plot 1500 of the error-performance of the slot-matching algorithm when using plain uncorrected traces and with traces that have been corrected using the fingerprinting algorithm described above. In one embodiment, the fingerprinting approach described in the previous section significantly lowers the error rate in slot assignments.

In one embodiment, the power source for the in-car nodes is a power inverter used to convert the 12 volt DC vehicle power supply to AC power suitable for a standard PC power supply. In another embodiment, DC to DC power supplies are installed in each car node and they are connected directly to the fuse box.

In one embodiment, moving vehicles (e.g., in a different lane than the sensing vehicle) can be distinguished from parked vehicles by the length of sensor dips. A car moving at similar speeds as the sensing vehicle, for example, generates a very long dip. In another embodiment, a sensor with a much larger range can greatly help lane detection.

In one embodiment, the server 205 displays (or causes to be displayed) a list of a few best possible (e.g., closest, most likely to remain unoccupied, price per hour) parking spaces to the vehicle 105 on the road looking for a parking space. In another embodiment, the server 205 transmits to the vehicle 105 (or causes to be displayed) a gross indication of the availability of parking spaces on the streets in an urban area. For example, the gross indication may be that 10-20% of spaces are available, 20%-50% of spaces are available, 50%-75% of spaces are available, etc. In one embodiment, the server 205 provides real time information about the level of parking space availability on nearby streets to parking garages to allow them to dynamically tune their prices for parking in time.

Figure 16A:
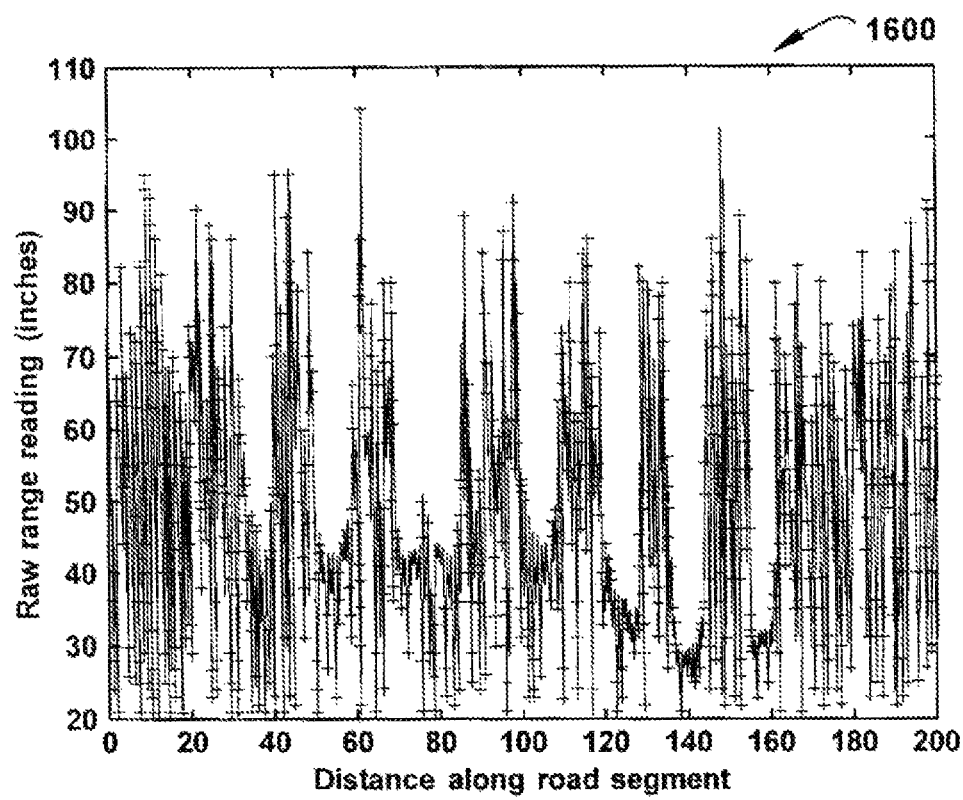
FIG. 16A shows a raw trace of range as reported by the sensor as a function of distance moved along a road segment in accordance with an embodiment of the present disclosure.
Figure 16B:
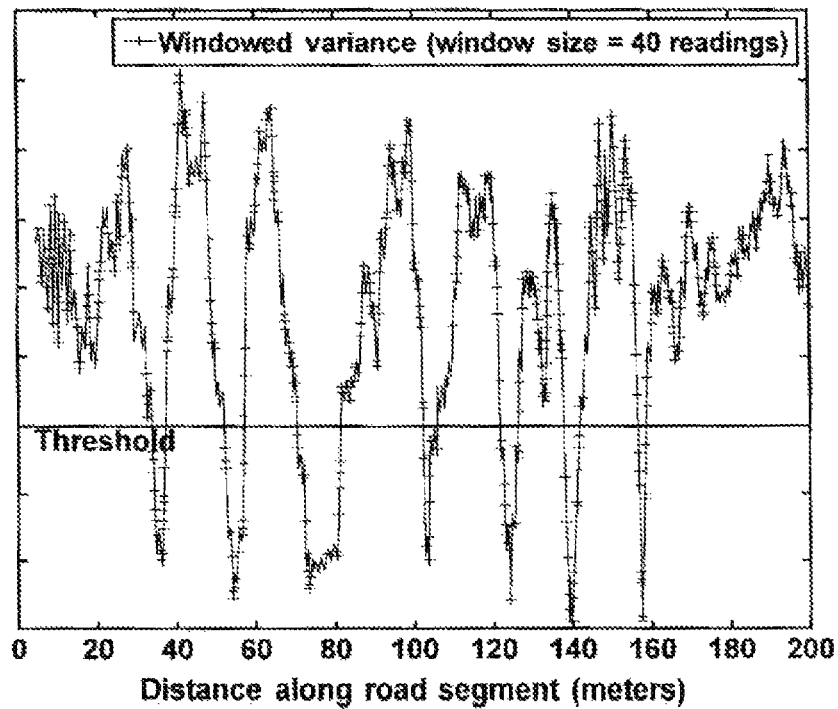
FIG. 16B shows a windowed variance on the raw trace of FIG. 16A in accordance with an embodiment of the present disclosure.

In one embodiment, the vehicle detection algorithm is based on sensing changes in the variance of the perceived range as a vehicle drives by parked vehicles. FIG. 16A shows a raw trace 1600 of range as reported by sensor 110 in inches as a function of distance moved along a certain road segment. FIG. 16B shows a windowed variance 1610 on the raw trace 1600 of FIG. 16A, and the locations of vehicles can be determined by detecting negative excursions on the windowed variance. Further, the width of the excursion (width along the x-axis) can be used to determine whether the excursion corresponds to a single car or more than one car. This can be done by comparing the width of the excursion to a constant that denotes the average length of a car, appropriately scaled by the speed of the measuring vehicle at the point when the excursion occurred.

In one embodiment, the vehicle detection algorithm is based on windowed variance and threshold detection.

Input: r(d): Range readings r at distances d along a road segment, WindowSize,
Threshold
Output: Locations of parked vehicles
Compute Windowed Variance
for i=1 to length[r(d)]−WindowSize do|V (i)=variance(r (d(i): d(i+WindowSize))) end
Detect locations of vehicles:
L=Locations of negative excursions of V below
Threshold W=Width of the excursions.
L, W provide the locations and number of parked vehicles.

Apart from the above windowed variance algorithm, other methods for detecting parked vehicles include, for example, windowed mean, or windowed mean in combination with windowed variance. In an algorithm that uses windowed mean in combination with windowed variance, a parked vehicle will be declared to be detected if both the windowed mean and the windowed variance are seen to fall below pre-defined thresholds set for the mean and variance respectively. Additionally, information about the width of the excursions in the windowed mean and/or windowed variance can be used in conjunction with the speed of the sensor vehicle (reported by the GPS receiver) to infer the number of vehicles parked in a contiguous block one after the other. In the example of FIG. 16, for instance, the third excursion corresponds to two vehicles parked next to one another.

Figure 17:
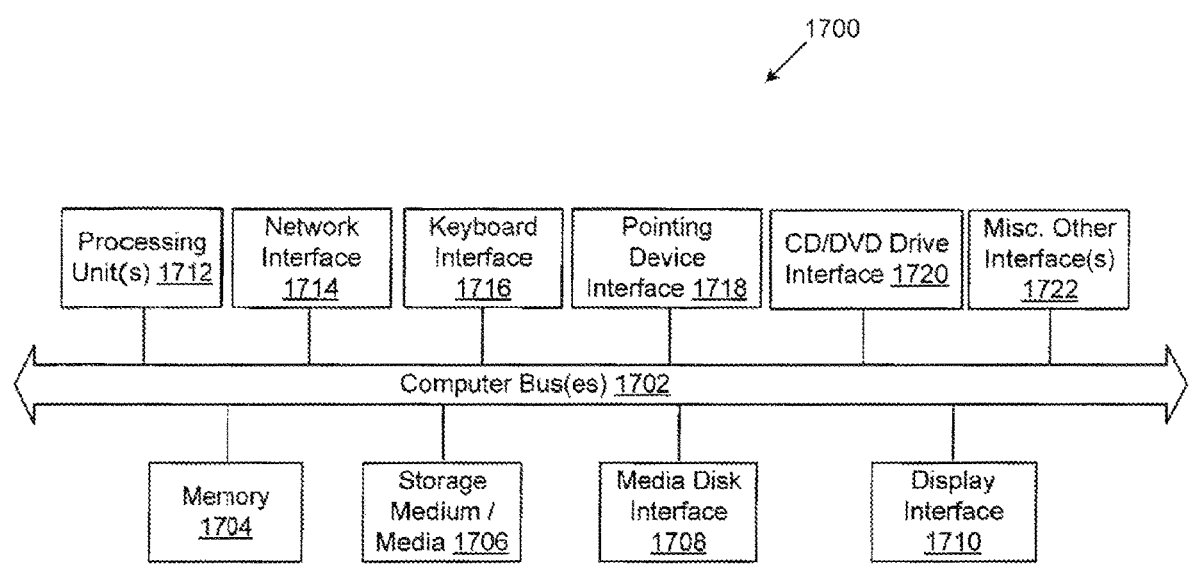
FIG. 17 is a block diagram illustrating an internal architecture of an example of a computing device, such as the server and/or computing device of FIG. 2, in accordance with an embodiment of the present disclosure

FIG. 17 is a block diagram illustrating an internal architecture of an example of a computing device, such as server 205 and/or computing device 230, in accordance with one or more embodiments of the present disclosure. As shown in FIG. 17, internal architecture 1700 includes one or more processing units (also referred to herein as CPUs) 1712, which interface with at least one computer bus 1702. Also interfacing with computer bus 1702 are persistent storage medium/media 1706, network interface 1714, memory 1704, e.g., random access memory (RAM), run-time transient memory, read only memory (ROM), etc., media disk drive interface 1708 as an interface for a drive that can read and/or write to media including removable media such as floppy, CD-ROM, DVD, etc. media, display interface 1710 as interface for a monitor or other display device, keyboard interface 1716 as interface for a keyboard, pointing device interface 1718 as an interface for a mouse or other pointing device, and miscellaneous other interfaces not shown individually, such as parallel and serial port interfaces, a universal serial bus (USB) interface, and the like.

Memory 1704 interfaces with computer bus 1702 so as to provide information stored in memory 1704 to CPU 1712 during execution of software programs such as an operating system, application programs, device drivers, and software modules that comprise program code, and/or computer-executable process steps, incorporating functionality described herein, e.g., one or more of process flows described herein. CPU 1712 first loads computer-executable process steps from storage, e.g., memory 1704, storage medium/media 1706, removable media drive, and/or other storage device. CPU 1712 then can execute the stored process steps in order to execute the loaded computer-executable process steps. Stored data, e.g., data stored by a storage device, can be accessed by CPU 1712 during the execution of computer-executable process steps.

Persistent storage medium/media 1706 is a computer readable storage medium(s) that can be used to store software and data, e.g., an operating system and one or more application programs. Persistent storage medium/media 1706 also can be used to store device drivers, such as one or more of a digital camera driver, monitor driver, printer driver, scanner driver, or other device drivers, web pages, content files, playlists and other files. Persistent storage medium/media 1706 can further include program modules and data files used to implement one or more embodiments of the present disclosure. Persistent storage medium/media 1706 can be either remote storage or local storage in communication with the computing device.

For the purposes of this disclosure, a computer readable storage medium tangibly stores computer data, which data can include computer program code executable by a computer, in machine readable form. Computer storage media includes volatile and non-volatile, removable and non-removable media implemented in any method or technology for storage of information such as computer-readable instructions, data structures, program modules or other data.

Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A system comprising:
   a sensor circuit mountable to a vehicle, the sensor circuit comprising:
   one or more sensors that are configured to generate sensor information as the vehicle moves along a path, the sensor information indicating one or more spatial changes to regions laterally adjacent the vehicle and including sensed data usable to determine at least a first dimension of the one or more spatial changes; and
   one or more processors configured to:
   determine at least a second dimension of the one or more spatial changes based on a plurality of consecutive instances of sensed data gathered while the vehicle moves along the path, wherein the second dimension includes width of a first spatial change across the consecutive instances, determined at least in part based on a sampling rate associated with the sensor information and a speed of the vehicle;
   translate the sensor information into detailed parking information showing parking availability for at least portions of the path based on the determined first and second dimensions; and
   provide the parking information to one or more vehicles for visual output.

2. The system of claim 1, wherein the sensed data includes distances indicating at least one of a detected obstruction or a maximum detection distance, and wherein the first dimension includes the depth of a spatial change.

3. The system of claim 1, wherein the sampling rate is defined based at least in part on the speed of the vehicle.

4. The system of claim 1, wherein the sampling rate is defined to collect a minimum number of a plurality of sensed data instances over a predefined distance associated with at least one of a parking space length or vehicle length.

5. The system of claim 1, wherein the parking information includes indication of available space for parking for the at least the portions of the path that include unslotted parking.

6. The system of claim 5, wherein the one or more processors are further configured to determine the available space for parking based at least in part on determining when a given spatial change indicates an empty space based on the first and second dimensions, based on when the empty space is located in a usable parking area based on predefined parking data, and how many vehicles can fit within the empty space based on dimensions of the empty space compared to predefined parking space length requirements.

7. The system of claim 1, wherein the parking information includes a number of available spaces for parking for the at least the portions of the path that include slotted parking.

8. The system of claim 7, wherein the one or more processors are further configured to determine the available space for parking based at least in part on determining when a given spatial changes indicates an empty space based on the first and second dimensions and based on when the empty space corresponds to a slotted parking location based on predefined parking data and a location of the empty space.

9. The system of claim 8, wherein the one or more processors are further configured to determine the location of the empty space based on locations of the vehicle when gathering the sensor data indicative of the spatial change to which the empty space correlates.

10. A vehicle comprising:
    one or more sensors configured to generate sensor information, indicative of parking spaces adjacent the vehicle as the vehicle moves along a path; and
    one or more processors configured to:
    communicate, via a network, the sensor information to a remote computing device that translates the sensor information into at least parking statistical information;
    access the parking statistical information via the network; and
    output the parking statistical information on an audio/visual device.

11. The vehicle of claim 10, wherein the computing device determines if the at least one other vehicle is in a slotted parking area or an unslotted parking area based on the sensor information.

12. The vehicle of claim 11, wherein the computing device translates the sensor information into parking space counts when it determines that the at least one other vehicle is in the slotted parking area or translates the sensor information into a parking space map when it determines that the at least one other vehicle is in the unslotted parking area.

13. The vehicle of claim 10, wherein the computing device uses the sensor information to identify a number of available parking spots on a given road.

14. The vehicle of claim 10, wherein the computing device predicts availability of parking based on the parking statistics information.

15. The vehicle of claim 10, wherein the computing device compares the sensor information to a set of signatures known to correspond to typical vehicles to determine whether the sensor information indicates the presence of at least one vehicle.

16. The vehicle of claim 10, wherein the sensor information is aggregated with at least one of sensor information Obtained over a predetermined period of time prior to being translated at the computing device or sensor information obtained from multiple passes along each road.

17. The vehicle of claim 10, wherein the computing device combine the sensor information with information from a parking spot map.

18. The vehicle of claim 10, wherein the computing device generates a gross indication of parking availability based on the sensor information.

19. The vehicle of claim 10, wherein the sensor information includes video, from a camera sensor of the one or more sensors, including a plurality of time-stamped images.

20. The vehicle of claim 10, wherein the one or more sensors include an ultrasonic rangefinder.

21. The vehicle of claim 20, wherein the sensor information from the ultrasonic rangefinder is location-stamped and time-stamped.

22. A method comprising:
receiving sensor information, from at least one sensor attached to at least one vehicle, the sensor information including timing data indicating:
a time of generation of each respective sensor signal of a plurality of generated sensor signals, and
a time of reception of a signal reflection associated with a respective reflected sensor signal corresponding to a given generated sensor signal of the plurality of generated sensor signals;
determining a plurality of time differences based on the timing data, based on a difference between the time of generation for each generated sensor signal and the time of reception of the signal reflection for each respective, corresponding reflected sensor signal;
identifying plurality of consecutive variances representative of at least one of a vehicle or an empty space, based at least in part on at least one set of consecutive time differences within the plurality of time differences, wherein each consecutive time difference of the at least one set of consecutive time differences comprise a value indicative of at least a vehicle or a space based on a corresponding predefined threshold for the vehicle or the space compared to the each consecutive time difference;
determining a parking availability status based at least in part on a length threshold compared to a length of the vehicle or the space represented by the consecutive time differences, wherein the length includes a distance over which the consecutive time distances of the set of consecutive time distances were gathered; and
transmitting an indication of the parking availability status to at least one computing device to indicate a presence or an absence of an available parking space.

23. The method of claim 22, wherein the distance over which the consecutive time distances were gathered is determined based at least in part on a count of consecutive time distances.

24. The method of claim 22, further comprising generating at least one parking availability metric based at least in part on an aggregated count of available parking spaces in a region indicated by a plurality of sets of the consecutive time differences.

25. The method of claim 22, wherein the parking availability status includes one or more of an unavailable parking space indicator indicating an unavailable parking space based on the at least one set of consecutive time differences indicative of a vehicle or an available parking space indicator indicating an available parking space based on the at least one set of consecutive time differences indicating a space.

26. The method of claim 22, further comprising:
receiving video data from a video capture device associated with the at least one vehicle, wherein the video data includes a plurality of frames of video captured by the video capture device and a plurality of time stamps correlated to respective frames of the video; and
verifying the parking availability status based on the video data.

27. The method of claim 22, further comprising:
receiving location data associated with the at least one vehicle, derived from locations of the at least one vehicle when the received sensor information was gathered by the at least one vehicle; and
determining a location associated with the parking availability status based on the location data.

28. The method of claim 27, wherein the location data is correlated to individual elements of the received sensor data, the individual elements representing one signal generation and receipt cycle and the location data indicating locations where the vehicle was located at least one of the time of generation or the time of reception.

29. The method of claim 22, wherein the received sensor information further indicates a vehicle average speed over a distance traveled, by the vehicle, between the time of generation and the corresponding time of reception for at least one generated sensor signal included in the received sensor information.

* * * * *